United States Patent
Kim (12) United States Patent (10) Patent No.: US 7,190,656 B2
(45) Date of Patent: Mar. 13, 2007

(54) APPARATUS AND METHOD FOR CONTROLLING TRACKING AND FOCUSING SERVO IN A HOLOGRAPHIC DIGITAL DATA STORAGE SYSTEM

(75) Inventor: Kun Yul Kim, Seoul (KR)

(73) Assignee: Daewoo Electronics Corporation, Seoul (KR)

(*) Notice: Subject to any disclaimer, the term of this patent is extended or adjusted under 35 U.S.C. 154(b) by 566 days.

(21) Appl. No.: 10/787,106

(22) Filed: Feb. 27, 2004

(65) Prior Publication Data

US 2005/0088923 A1   Apr. 28, 2005

(30) Foreign Application Priority Data

Oct. 22, 2003  (KR) ................ 10-2003-0073730
Dec. 15, 2003  (KR) ................ 10-2003-0091067

(51) Int. Cl.
*G11B 7/00* (2006.01)

(52) U.S. Cl. .................... 369/103; 369/44.24
(58) Field of Classification Search .............. None
See application file for complete search history.

(56) References Cited

U.S. PATENT DOCUMENTS 5,978,112 A    11/1999  Psaltis et al.
6,111,828 A *   8/2000  McLeod et al. ......... 369/44.23
6,563,779 B1 *  5/2003  McDonald et al. ......... 369/103
6,574,174 B1 *  6/2003  Amble et al. ............ 369/44.26
2002/0041561 A1  4/2002  Tsukamoto et al.
2002/0136143 A1  9/2002  Edwards

FOREIGN PATENT DOCUMENTS

JP        5-151593      6/1993
JP        2002-063729   2/2002

* cited by examiner

*Primary Examiner*—William Korzuch
*Assistant Examiner*—Christopher Lamb
(74) *Attorney, Agent, or Firm*—Bacon & Thomas, PLLC

(57) ABSTRACT

A holographic storage system includes a beam supplying unit for supplying an incident beam including data read from a plurality of tracks on a holographic medium; a transferring unit for receiving the incident beam and producing a focused beam; a tracking servo unit for receiving a first portion of the focused beam through a plurality of pinholes and reflecting a second portion of the focused beam back to the transferring unit through a reflecting section simultaneously, wherein the tracking servo unit moves the transferring unit or the pinholes to adjust the amount of the first portion of the focused beam to thereby retrieve data from a target track, and wherein the second portion of the focused beam reflected back to the transferring unit is converted into a return beam by the transferring unit; and a focusing servo unit for compensating for vertical movements of the holographic medium.

9 Claims, 5 Drawing Sheets

APPARATUS AND METHOD FOR CONTROLLING TRACKING AND FOCUSING SERVO IN A HOLOGRAPHIC DIGITAL DATA STORAGE SYSTEM

FIELD OF THE INVENTION

The present invention relates to a holographic digital data storage system; and, more particularly, to an apparatus and method for controlling tracking and focusing of a laser beam on a disk of a holographic medium while the disk is rotating during playback.

BACKGROUND OF THE INVENTION

As is well known, demands for a holographic digital data storage system that can store a large amount of data have been increasing. Therefore, various types of holographic digital data storage systems have been recently developed for realizing high density optical storage capabilities.

The holographic digital data storage system, e.g., a holographic ROM system, allows a modulated signal beam carrying digital data (to be stored) to interfere with a reference beam to generate an interference pattern therebetween and, then, controls the interference pattern to be stored in a storage medium, e.g., a disk-shaped holographic medium, made of, e.g., an optical refractive crystal. The optical refractive crystal is a material which may react differently on different amplitudes and phases of the interference pattern.

In the holographic digital data storage system, various holograms can be recorded in a same spatial location by changing the angle of incidence of the reference beam (angular multiplexing), so that holograms can be stored in the holographic medium. After the holograms are recorded in the holographic medium, the disk-shaped holographic medium is inserted into, e.g., a holographic ROM player for replaying the holograms recorded in the holographic medium.

During playback, only a reference beam, which is preferably identical to that employed during the recording operation, is irradiated onto the holographic medium. The reference beam is then diffracted by the interference pattern recorded in the holographic medium to thereby reproduce the recorded binary data.

Figure 1:
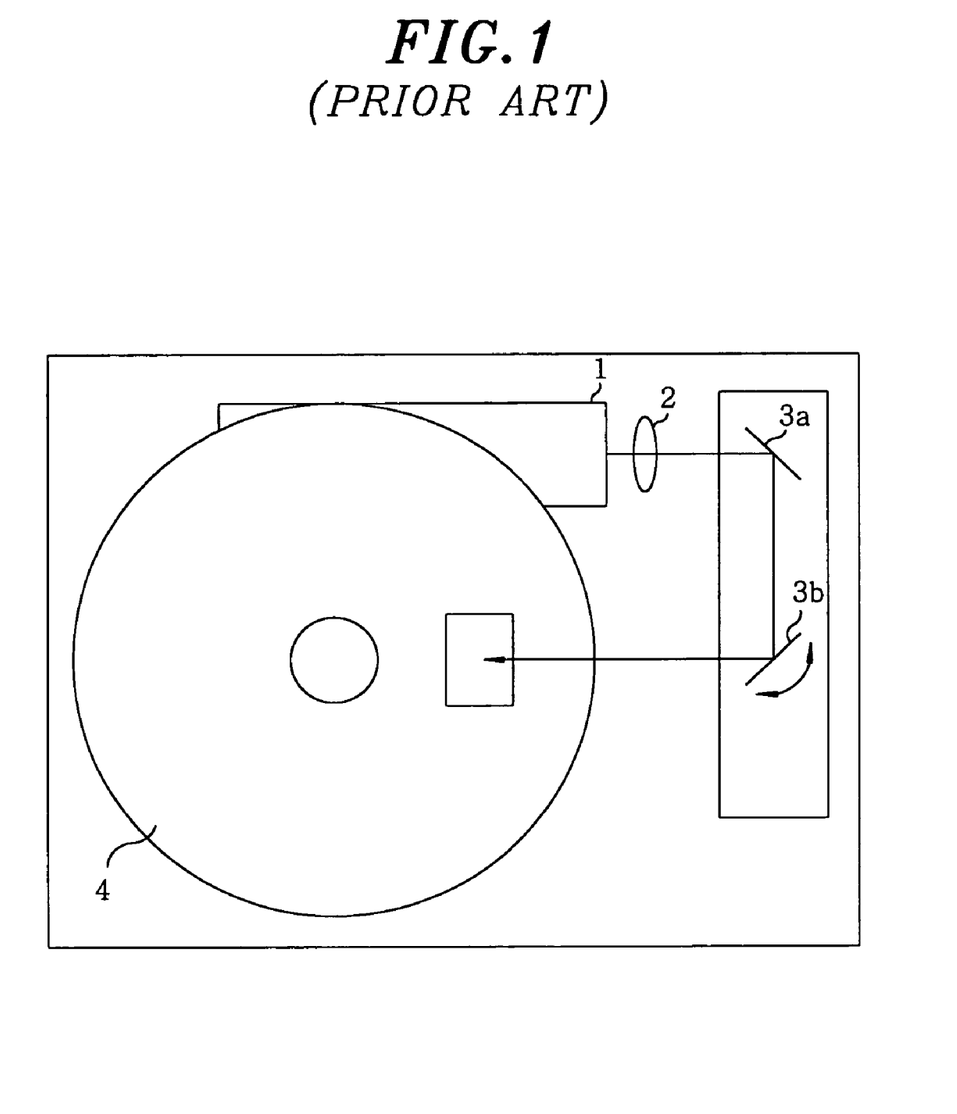
FIG. 1 shows a conventional holographic storage system during playback.

FIG. 1 shows a conventional holographic ROM system during playback (see "Holographic ROM system for high-speed replication", ISOM/ODS 2002, pp 144~146). The conventional holographic ROM system includes a light source 1; a beam reducer 2; mirrors 3a, 3b; and a holographic medium 4.

The light source 1 emits a reference beam with a constant wavelength, e.g., a wavelength of 532 nm. The reference beam is then provided to the beam reducer 2 for reducing the beam size of the reference beam down to a predetermined size. The reduced reference beam is reflected by the mirror 3a toward the mirror 3b. Thereafter, the mirror 3b reflects the reference beam toward a location of the holographic medium 4. The mirror 3b can be, e.g., rotated for reflecting the reference beam toward another layer of the holographic medium 4. The reference beam is then diffracted by the interference pattern recorded in the holographic medium 4 to thereby produce a regenerated beam.

Figure 2:
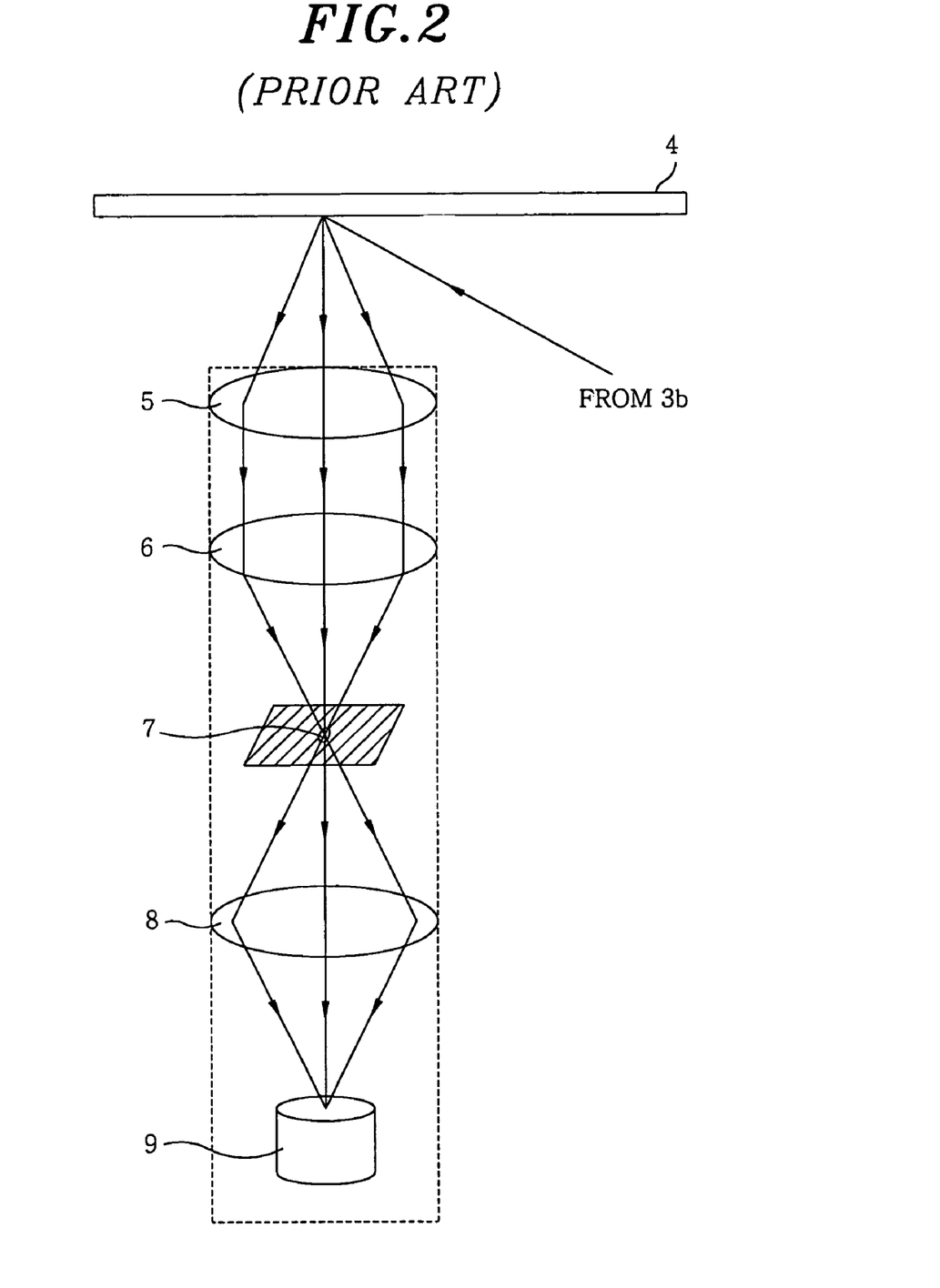
FIG. 2 presents a conventional pickup device for replaying data recorded on a plurality of tracks of a holographic medium in the holographic storage system.

FIG. 2 presents a conventional pickup device for replaying data recorded on a plurality of tracks of the holographic medium 4 of FIG. 1 in a holographic ROM player. The pickup device includes lenses 5, 6, 8; a pinhole 7; and a detector 9. In case the reference beam is incident on a location of the holographic medium 4 as shown in FIGS. 1 and 2, the regenerated beam is emitted from the location of the holographic medium 4. Since the size of the regenerated beam is, e.g., 100 µm, and a track pitch, which represents a spacing between tracks on the holographic medium 4, is, e.g., 0.74 µm, the regenerated beam includes therein quantities of data which are read from hundreds of tracks on the holographic medium 4.

Then, the regenerated beam is incident on the lens 5 which collimates the regenerated beam. The collimated beam is provided to the lens 6, which focuses the collimated beam at the pinhole 7 to thereby produce a focused laser beam. The focused laser beam including the quantities of data read from the hundreds of tracks is sifted through the pinhole 7, thereby being converted into the sifted laser beam including only data read from a target track. Subsequently, the sifted laser beam including only the data read from the target track is provided to the lens 8, which focuses the sifted laser beam at the detector 9. The detector 9 detects the data read from the target track in order to replay the hologram recorded on the target track.

However, the plurality of tracks formed on the holographic medium 4 are in a spiral shape and the holographic medium 4 may wobble when the holographic medium 4 rotates during playback. Therefore, a pickup apparatus is required for controlling the tracking and the focusing of the laser beam on a target track of the holographic medium 4. However, such a pickup apparatus for reproducing data from the disk-shaped holographic medium is not yet available although pickup apparatuses for either CD players or DVD players have already been commercialized.

Therefore, there has existed a need for a pickup apparatus for data reproduction in a holographic storage system to control minute changes in the tracking or the focusing operation.

SUMMARY OF THE INVENTION

It is, therefore, a primary object of the present invention to provide a pickup apparatus and method for controlling a tracking and focusing servo in a holographic storage system, capable of tracking and focusing a laser beam on a target track of a holographic medium.

In accordance with one aspect of the present invention, there is provided a holographic apparatus including: a transferring unit for receiving an incident laser beam including data read from a plurality of tracks on a holographic medium to produce a focused laser beam; a tracking servo unit for receiving a first portion of the focused laser beam through a plurality of pinholes and, at the same time, reflecting a second portion of the focused laser beam back to the transferring unit through a reflecting section, wherein the tracking servo unit moves the transferring unit or the pinholes to adjust the amount of the first portion of the focused laser beam to thereby retrieve data from a target track among the plurality of tracks, and wherein the second portion of the focused laser beam reflected back to the transferring unit is converted into a return laser beam by the transferring unit; and a focusing servo unit for focusing the return laser beam and then checking a focused image of the return laser beam to compensate for vertical movements of the holographic medium.

In accordance with another aspect of the present invention, there is provided a holographic apparatus including: a beam supplying unit for supplying an incident laser beam including data read from a plurality of tracks on a holographic medium; a focusing lens for focusing the incident laser beam at pinholes to thereby produce a focused laser beam; a pinhole plate for receiving a first portion of the focused laser beam through the pinholes and, at the same time, reflecting a second portion of the focused laser beam back to the focusing lens; a trisection detector for detecting the amount of the first portion of the focused laser beam passing through each of the pinholes; and an actuator for moving either the pinhole plate or the focusing lens to control the amount of the first portion of the focused laser beam passing through the pinholes for replaying a target track on the holographic medium, wherein the second portion of the focused laser beam reflected back to the focusing lens is converted into a return laser beam by the focusing lens, and wherein a focus servo unit focuses the return laser beam and then checks the focused image of the return laser beam to compensate for vertical movements of the holographic medium.

In accordance with a further aspect of the present invention, there is provided a holographic method including the steps of: (a) producing an incident laser beam by irradiating a reference beam onto a holographic medium having a plurality of tracks; (b) focusing the incident laser beam by a focusing lens, to thereby produce a focused laser beam; (c) receiving a first portion of the focused laser beam through pinholes which are located at a pinhole plate and, at the same time, reflecting a second portion of the focused laser beam back to the focusing lens by the pinhole plate; (d) detecting the amount of the first portion of the focused laser beam passing through the pinholes; and (e) moving either the pinhole plate or the focusing lens to control the amount of the first portion of the focused laser beam passing through the pinholes for replaying a target track on the holographic medium, wherein the second portion of the focused laser beam reflected back to the focusing lens is converted into a return laser beam by the focusing lens, and wherein a focus servo unit focuses the return laser beam and then checks the focused image of the return laser beam to compensate for vertical movements of the holographic medium.

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF THE PREFERRED EMBODIMENTS

Figure 3:
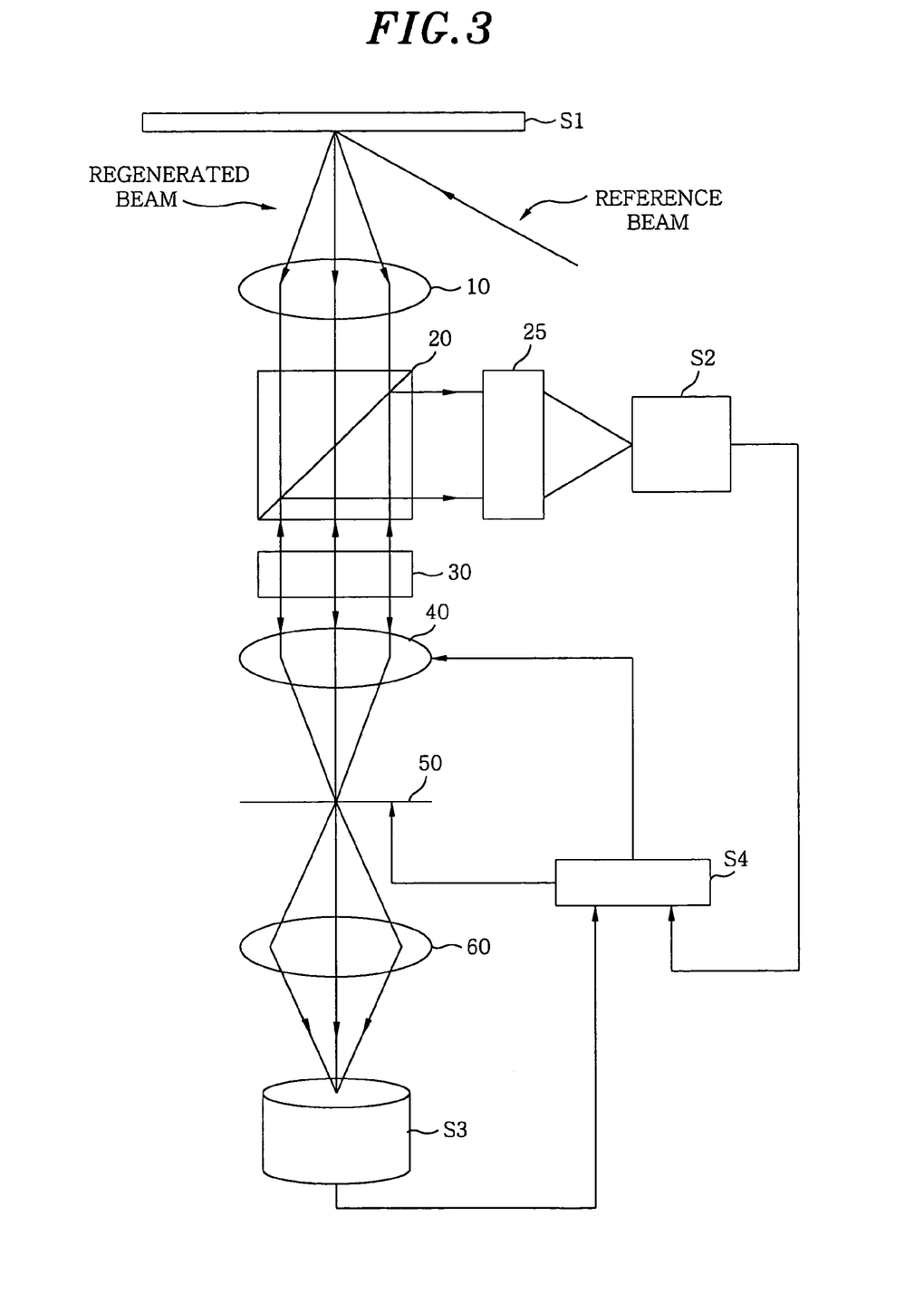
FIG. 3 depicts an exemplary pickup apparatus for controlling a tracking and focusing servo in a holographic storage system in accordance with the present invention.

FIG. 3 depicts a pickup apparatus for controlling a tracking and focusing servo in, e.g., a holographic ROM player, in accordance with the present invention. The holographic ROM player has a function of replaying, e.g., reading, data recorded on a disk-shaped holographic medium which is inserted thereinto. The pickup apparatus includes lenses 10, 40, 60; a PBS (polarization beam splitter) 20; an astigmatic lens 25; a QWP (quarter wave plate) 30; a pinhole plate 50; a quadrant detector S2; a trisection detector S3; and an actuator S4.

Once holograms are recorded on a disk-shaped holographic medium S1 by an angular multiplexing and/or a shift multiplexing, the recorded holograms can be reproduced during playback by irradiating a reference beam onto the holographic medium S1. The reference beam is then diffracted by the interference pattern recorded in the holographic medium S1 to thereby produce a regenerated beam. Since the size of the regenerated beam, which corresponds to that of the reference beam, may be as large as, e.g., 100 μm, and a track pitch is, e.g., 0.74 μm, the regenerated beam includes quantities of data which are read from hundreds of tracks on the holographic medium S1.

The regenerated beam, which is of only one type of linear polarization, e.g., S-polarization, is provided to the lens 10. Then, the lens 10 collimates the regenerated beam and a collimated beam is provided to the PBS 20 capable of transmitting, e.g., only a horizontally polarized laser beam, i.e., an S-polarized beam, and reflecting, e.g., a vertically polarized laser beam, i.e., a P-polarized beam. Since the collimated beam provided to the PBS 20 is S-polarized, the collimated beam is transmitted therethrough. And then, the transmitted collimated beam is provided to the QWP 30. In general, a QWP can have the unique property of converting a circularly polarized light into a linearly polarized light and vice versa. More specifically, an S-polarized beam (or a P-polarized beam) is turned into a circularly polarized beam after passing through a QWP and then the circularly polarized beam is transformed into a P-polarized beam (or an S-polarized beam) after passing through the QWP once again.

Figure 4:
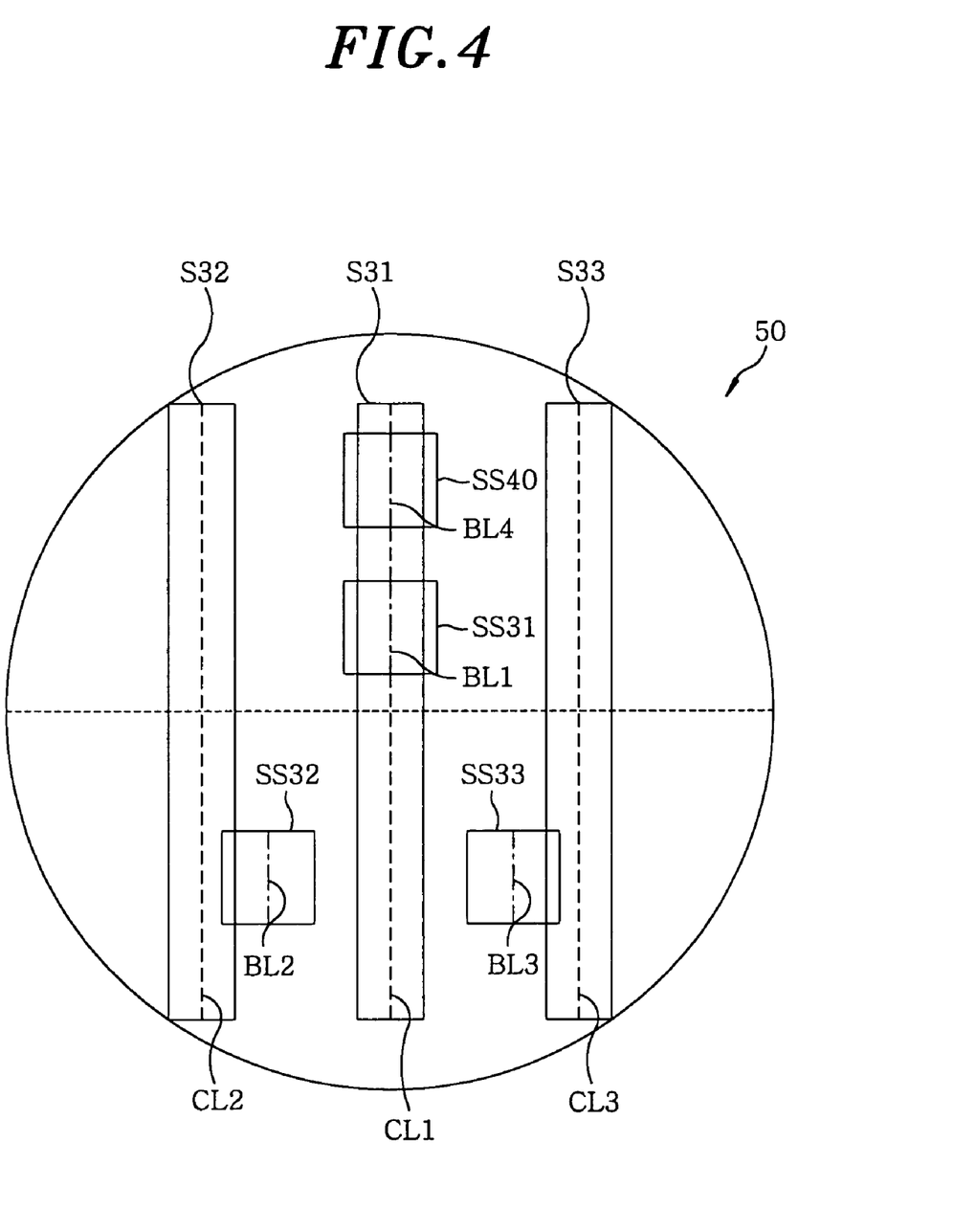
FIG. 4 represents a pinhole plate adopted in the pickup apparatus of FIG. 3 in accordance with the first preferred embodiment of the present invention.

Therefore, the QWP 30 converts the inputted S-polarized collimated beam into a circularly polarized collimated beam, which is then fed to the lens 40. The lens 40 focuses the circularly polarized collimated beam at the pinhole plate 50, because the pinhole plate 50 is located at a focal length of the lens 40. That is, the lens 40 converts the circularly polarized collimated beam into a focused laser beam. More specifically, the collimated beam containing data read from, e.g., a (n−1)th, a nth and a (n+1)th track on the holographic medium S1, n being positive integer, is focused at the pinhole plate 50 to thereby provide a focused (n−1)th track S32, a focused nth track S31 and a focused (n+1)th track S33, respectively, on the pinhole plate 50, as shown in FIG. 4. The nth track represents a target track to be read, and the (n−1)th and the (n+1)th tracks represent neighboring tracks nearest to the target track. The focused nth track S31, the focused (n−1)th track S32 and the focused (n+1)th track S33 are images of the nth, the (n−1)th and the (n+1)th tracks respectively, the images being focused on the pinhole plate 50.

Although hundreds of tracks are focused on the pinhole plate 50, FIG. 4 depicts only the focused nth track S31, the focused (n−1)th track S32 and the focused (n+1)th track S33 for the convenience of description.

The pinhole plate 50 is provided with pinholes SS31, SS32, SS33; and a reflecting section SS40 as shown in FIG. 4. The pinholes SS31, SS32, SS33; and the reflecting section SS40 are preferably of a rectangular shape, width of each of those being, e.g., 0.4 μm, which are slightly wider than those of tracks. The locations of the centers of the pinholes SS31, SS32, SS33 preferably form an isosceles triangle on the pinhole plate 50, the center of the pinhole SS31 being an apex of the isosceles triangle. The center of the reflecting section SS40 is preferably located above the center of the pinhole SS31 on the pinhole plate 50, so that a first line connecting the centers of the pinholes SS32 and SS33 is preferably perpendicular to a second line connecting the centers of the pinhole SS31 and the reflecting section SS40.

Herein, the pinhole SS31 is used for transmitting a first portion of the focused laser beam containing the data read from the target track to be replayed. Further, the pinholes SS32, SS33 are used for controlling the tracking servo when the holographic medium S1 rotates for data reproduction. In case the target track is properly traced, the pinhole SS31 and the reflecting section SS40 are located on the focused nth track S31.

In case a first center line CL1 which bisects the focused nth track S31 along the longitudinal direction of the focused tracks is coincident with a first bisecting line BL1 and a fourth bisecting line BL4 which bisect the pinhole SS31 and the reflecting section SS40 respectively along the longitudinal direction of the focused tracks, the first portion of the focused beam containing the data read from the nth track entirely passes through the pinhole SS31. Even in a case where, the first center line CL1 is not precisely coincident with the first bisecting line BL1 and the fourth bisecting line BL4, if the gap between the first bisecting line BL1 and the first center line CL1 is equal to or smaller than a half of the difference between widths of the pinhole SS31 and the focused nth track S31, the first portion of the focused laser beam from the nth track S31 entirely passes through the pinhole SS31.

The pinholes SS32, SS33 are partially overlapped with the focused (n−1)th track S32 and the focused (n+1)th track S33 respectively. A second bisecting line BL2 which bisects the pinhole SS32 is positioned between the first center line CL1 and a second center line CL2 which bisects the focused (n−1)th track S32 along the longitudinal direction of the focused tracks, and a third bisecting line BL3 which bisects the pinhole SS33 is positioned between the first center line CL1 and a third center line CL3 which bisects the focused (n+1)th track S33 along the longitudinal direction of the focused tracks.

In case the amount of a second portion of the focused laser beam passing through the second pinhole SS32 is the same as that of a third portion of the focused laser beam passing through the third pinhole SS33, the overlapped area of the focused (n−1)th track S32 and the second pinhole SS32 may be identical to that of the focused (n+1)th track S33 and the third pinhole SS33. That is, the gap between the second center line CL2 and the second bisecting line BL2 becomes identical to that between the third center line CL3 and the third bisecting line BL3. Therefore, the first portion of the focused laser beam containing the data read from the nth track entirely passes through the pinhole SS31.

However, the first portion of the focused laser beam containing the data read from the nth track may not entirely pass through the pinhole SS31 as time goes by during playback, because a plurality of tracks formed on the holographic medium S1 have a spiral shape and because the holographic medium S1 may wobble.

In case the first, the second and the third pinhole SS31, SS32, SS33 are moved toward the focused (n−1)th track S32 either due to a spiral structure of the tracks or due to a wobbling of the holographic medium S1, the overlapped area of the focused (n−1)th track S32 and the second pinhole SS32 becomes larger than that of the focused (n+1)th track S33 and the third pinhole SS33. Therefore, the amount of the second portion of the focused laser beam passing through the second pinhole SS32 becomes larger than that of the third portion of the focused laser beam passing through the third pinhole SS33.

On the other hand, if the first, the second and the third pinhole SS31, SS32, SS33 are moved toward the focused (n+1)th track S33 either due to the spiral structure of the tracks or due to the wobbles of the holographic medium S1, the overlapped area of the focused (n−1)th track S32 and the second pinhole SS32 becomes smaller than that of the focused (n+1)th track S33 and the third pinhole SS33. Therefore, the amount of the second portion of the focused laser beam passing through the second pinhole SS32 becomes smaller than that of the third portion of the focused laser beam passing through the third pinhole SS33.

A part of the focused laser beam passing through the first, the second and the third pinholes SS31, SS32, SS33 is provided to the lens 60. The lens 60 focuses the part of the focused laser beam at the trisection detector S3. In case the amount of the second portion of the focused laser beam passing through the second pinhole SS32 is not identical to that of the third portion of the focused laser beam passing through the third pinhole SS33, the trisection detector S3 sends an information signal, which indicates which of the amounts of the second portion and the third portion is larger, to the actuator S4. Then, the actuator S4 controls the position of either the lens 40 or the pinhole plate 50 in a direction parallel with the holographic medium S1, to thereby adjust the amount of the second portion of the focused laser beam passing through the second pinhole SS32 to be identical to that of the third portion of the focused laser beam passing through the third pinhole SS33. Thus, the first portion of the focused laser beam containing the data read from the nth track entirely passes through the first pinhole SS31, to thereby complete the tracking servo procedure. The above-mentioned tracking servo procedure is executed microscopically. However, a macroscopic tracking servo procedure, which is well known to those skilled in the art, is executed by moving the entire pickup apparatus.

In the meantime, when the lens 40 focuses the circularly polarized collimated beam to thereby provide the circularly polarized focused laser beam to the pinhole plate 50, the reflecting section SS40 reflects the circularly polarized focused laser beam back to the lens 40. Then, the lens 40 converts the reflected circularly polarized focused laser beam into a reflected circularly polarized collimated beam which is provided to the QWP 30.

Thereafter, the QWP 30 transforms the reflected circularly polarized collimated beam into a P-polarized collimated beam and then provides the P-polarized collimated beam to the PBS 20. Since the P-polarized collimated beam is reflected by the PBS 20, the astigmatic lens 25 receives the P-polarized collimated beam from the PBS 20. Then, the astigmatic lens 25, which has a conventional configuration to include a focusing lens and a cylindrical lens, irradiates the P-polarized collimated beam onto the quadrant detector S2 in order to compensate for vertical movements of the holographic medium S1, i.e., to execute the focusing servo procedure. The focusing procedure is preferably executed by moving either the lens 40 or the pinhole plate 50 in a direction normal to the holographic medium S1. The focusing servo procedure employing the astigmatic lens 25 and the quadrant detector S2 is well known to those skilled in the art.

Figure 5:
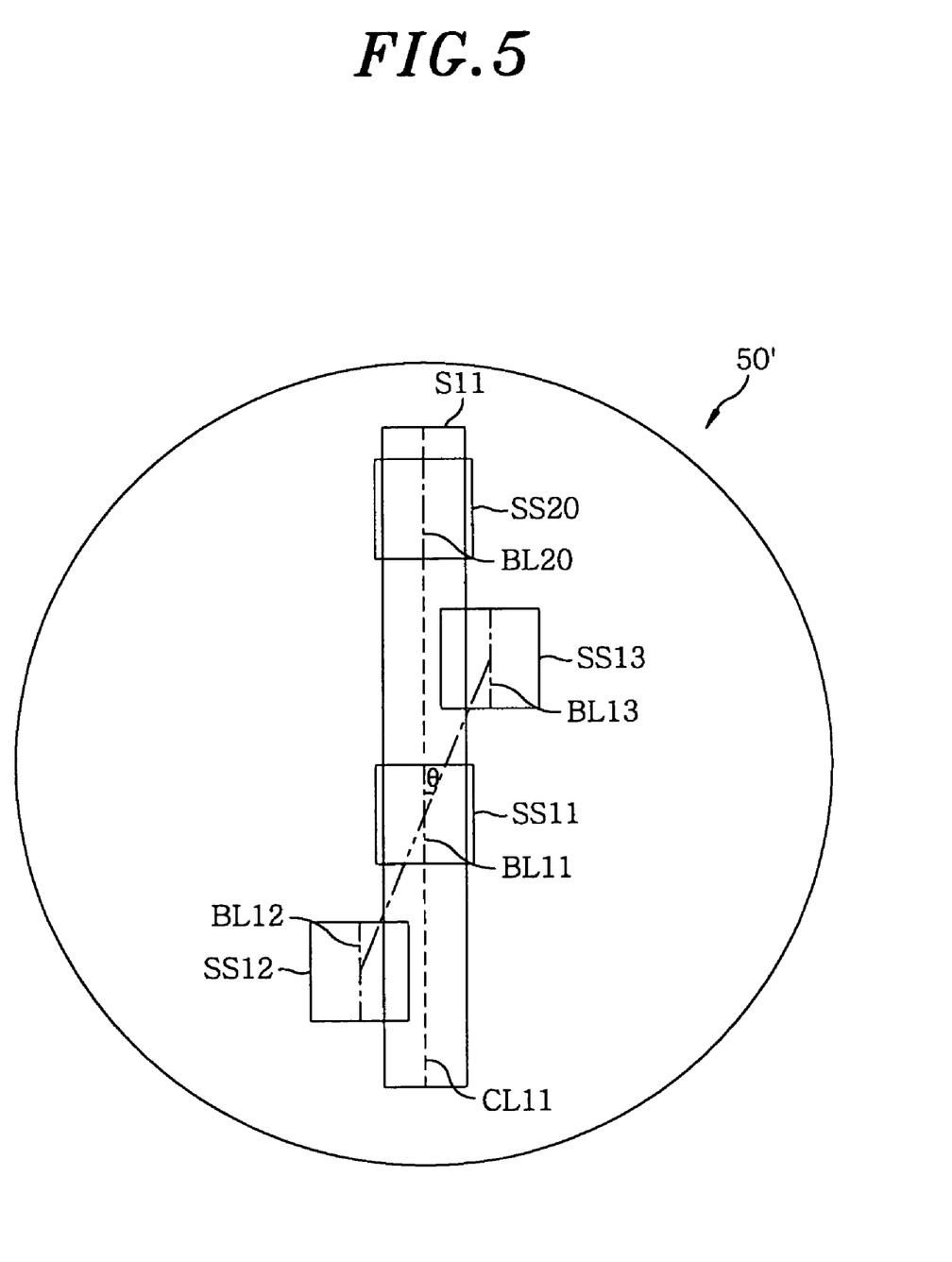
FIG. 5 illustrates a pinhole plate which can be substituted for the pinhole plate of FIG. 4 in accordance with a second preferred embodiment of the present invention.

FIG. 5 illustrates a pinhole plate 50' which can be substituted for the pinhole plate 50 in the pickup apparatus of FIG. 3 in accordance with a second preferred embodiment of the present invention.

The functions of the other parts of the pickup apparatus of the second preferred embodiment except the pinhole plate 50' are basically identical to those of the first preferred embodiment, so that detailed explanation thereabout is abbreviated.

For the convenience of description, FIG. 5 depicts only a focused target track S11, which is an image of the target track focused on the pinhole plate 50' by the lens 40 of FIG. 3, although hundreds of tracks are focused thereon.

In the pinhole plate 50', there are provided pinholes SS11, SS12, SS13; and a reflecting section SS20 as shown in FIG. 5. The pinholes SS11, SS12, SS13; and the reflecting section SS20 are preferably rectangular shape, widths thereof being, e.g., 0.4 μm, which are slightly wider than those of tracks. The locations of the centers of the pinholes SS11, SS12, SS13 preferably form a first straight line on the pinhole plate 50', the center of the pinhole SS11 being a bisecting point of the first straight line. An angle between the first straight line and a second straight line connecting the centers of the reflecting section SS20 and the pinhole SS11 on the pinhole plate 50' is preferably θ degree. Moreover, the pinholes SS11, SS12, SS13; and the reflecting section SS20 are not overlapped each other.

Herein, the pinhole SS11 is used for transmitting the first portion of the focused laser beam containing the data read from the target track to be replayed. Further, the pinholes SS12, SS13 are used for controlling the tracking servo when the holographic medium S1 rotates for playback. In case the target track is properly replayed, all of the pinhole SS11 and the reflecting section SS20 are entirely overlapped with the focused target track S11, but the pinholes SS12, SS13 are partially overlapped therewith. The angle θ can be varied only if the pinholes SS12, SS13 are partially overlapped with the focused target track S11 while the data on the target track is properly retrieved.

In case a center line CL11 which bisects the focused target track S11 along the longitudinal direction of the focused tracks is coincident with a bisecting line BL11 and a bisecting line BL20 which bisect the pinhole SS11 and the reflecting section SS20 respectively along the longitudinal direction of the focused tracks, the first portion of the focused beam containing the data read from the target track entirely passes through the pinhole SS11. Moreover, in case the center line CL11 is not precisely coincident with the bisecting line BL11 and the bisecting line BL20, if the gap between the bisecting line BL11 and the center line CL11 is equal to or smaller than a half of the difference between breadths of the pinhole SS11 and the focused target track S11, the first portion of the focused laser beam entirely passes through the pinhole SS11.

In the meantime, the pinholes SS12, SS13 are partially overlapped with the focused target track S11. In case a gap between a bisecting line BL12 which bisects the pinhole SS12 along the longitudinal direction of the focused tracks and the center line CL11 is identical to that between a bisecting line BL13 which bisects the pinhole SS13 and the center line CL11 along the longitudinal direction of the focused tracks, the first portion of the focused laser beam containing the data read from the target track entirely passes through the pinhole SS11. Since the overlapped area of the focused target track S11 and the pinhole SS12 is identical to that of the focused target track S11 and the pinhole SS13, the amount of a second portion of the focused laser beam passing through the pinhole SS12 is the same as that of a third portion of the focused laser beam passing through the pinhole SS13.

However, the first portion of the focused laser beam containing the data read from the target track may not entirely pass through the pinhole SS11 as time goes by during playback, because a plurality of tracks formed on the holographic medium S1 have shapes of spiral and because the holographic medium S1 may wobble, as mentioned above. For example, if the focused target track S11 is moved toward the pinhole SS13 either due to a spiral structure of the tracks or due to a wobbling of the holographic medium S1, the overlapped area of the focused target track S11 and the pinhole SS13 becomes larger than that of the focused target track S11 and the pinhole SS12. Therefore, the amount of the second portion of the focused laser beam passing through the pinhole SS12 becomes smaller than that of the third portion of the focused laser beam passing through the pinhole SS13. Otherwise, if the focused target track S11 is moved toward the pinhole SS12 either due to the spiral structure of the tracks or due to the wobbles of the holographic medium S1, the overlapped area of the focused target track S11 and the pinhole SS12 becomes larger than that of the focused target track S11 and the pinhole SS13. Therefore, the amount of the second portion of the focused laser beam passing through the pinhole SS12 becomes larger than that of the third portion of the focused laser beam passing through the pinhole SS13.

A part of the focused laser beam passing through the pinholes SS11, SS12, SS13 is provided to the lens 60. The lens 60 focuses the part of the focused laser beam at the trisection detector S3. In case the amount of the second portion of the focused laser beam passing through the pinhole SS12 is not identical to that of the third portion of the focused laser beam passing through the pinhole SS13, the trisection detector S3 sends the information signal, which indicates which of the amounts of the second portion and the third portion is larger, to the actuator S4, to thereby execute the tracking servo procedure as mentioned above.

On the other hand, the reflecting section SS20 on the pinhole plate 50' serves to execute the focusing servo procedure as mentioned above.

Since only one track is used for the tracking servo in accordance with the second preferred embodiment of the present invention, the pickup apparatus can be applied to a first and a last track, which do not have two neighboring tracks nearest thereto. Moreover, since data are not recorded uniformly on the plurality of tracks of the holographic medium S1, the second preferred embodiment using only one track rather than three tracks can execute the tracking servo more accurately.

As such, the pickup apparatuses and methods of the preferred embodiments of the present invention can execute both the tracking servo and the focusing servo while the holographic data are being replayed by the holographic ROM player. Moreover, the pick apparatuses and methods of the preferred embodiments of the present invention can be applied to any holographic storage system which can be used for either writing or reading holographic data on or from the holographic medium.

While the invention has been shown and described with respect to the preferred embodiments, it will be understood by those skilled in the art that various changes and modifications may be made without departing from the spirit and the scope of the invention as defined in the following claims.

What is claimed is:

1. A holographic apparatus comprising:

a transferring unit for receiving an incident laser beam including data read from a plurality of tracks on a holographic medium to produce a focused laser beam;

a tracking servo unit for receiving a first portion of the focused laser beam through a plurality of pinholes and, at the same time, reflecting a second portion of the focused laser beam back to the transferring unit through a reflecting section, wherein the tracking servo unit moves the transferring unit or the pinholes to adjust the amount of the first portion of the focused laser beam to thereby retrieve data from a target track among the plurality of tracks, and wherein the second portion of the focused laser beam reflected back to the transferring unit is converted into a return laser beam by the transferring unit; and a focusing servo unit for focusing the return laser beam and then checking a focused image of the return laser beam to compensate for vertical movements of the holographic medium.

2. The apparatus of claim 1, wherein the tracking servo unit includes:

a pinhole plate provided with the pinholes and the reflecting section;

a trisection detector for detecting the amount of the first portion of the focused laser beam passing through the pinholes; and an actuator for moving either the pinhole plate or the transferring unit to control the amount of the first portion of the focused laser beam passing through each of the pinholes.

3. The apparatus of claim 2, wherein the pinholes have a first pinhole for receiving a first region of the focused laser beam containing data of the target track to retrieve data from the target track, a second pinhole and a third pinhole for receiving a portion of the focused laser beam containing data of two tracks nearest to the target track respectively, and wherein the trisection detector compares the amount of a second region of the focused laser beam passing through the second pinhole with that of a third region of the focused laser beam passing through the third pinhole.

4. The apparatus of claim 3, wherein the actuator moves either the pinhole plate or the transferring unit in order to adjust the amount of the second region of the focused laser beam passing through the second pinhole to be equal to that of the third region of the focused laser beam passing through the third pinhole.

5. The apparatus of claim 2, wherein, in case the target track is replayed, the pinholes have a first pinhole for entirely receiving a target region of the focused laser beam containing data of the target track to retrieve data from the target track, a second pinhole and a third pinhole for partially receiving the target region of the focused laser beam, the second pinhole and the third pinhole being located on both sides of the target region, and wherein the trisection detector compares the amount of a second region of the focused laser beam passing through the second pinhole with that of a third region of the focused laser beam passing through the third pinhole.

6. The apparatus of claim 1, wherein the transferring unit includes:

a polarization beam splitter for transmitting the incident laser beam;

a quarter wave plate for converting the incident laser beam into a first collimated laser beam; and a focusing lens for focusing the first collimated laser beam at the pinholes, to thereby produce the focused laser beam, wherein the second portion of the focused laser beam is reflected back to the focusing lens through the reflecting section and the focusing lens transforms the second portion of the focused laser beam into a second collimated laser beam, and wherein the quarter wave plate converts the second collimated laser beam into the return laser beam which is reflected toward the focusing servo unit by the polarization beam splitter.

7. The apparatus of claim 6, wherein the pinholes are located at a focal length of the focusing lens.

8. A holographic apparatus comprising:

a beam supplying unit for supplying an incident laser beam including data read from a plurality of tracks on a holographic medium;

a focusing lens for focusing the incident laser beam at pinholes to thereby produce a focused laser beam;

a pinhole plate for receiving a first portion of the focused laser beam through the pinholes and, at the same time, reflecting a second portion of the focused laser beam back to the focusing lens;

a trisection detector for detecting the amount of the first portion of the focused laser beam passing through each of the pinholes; and an actuator for moving either the pinhole plate or the focusing lens to control the amount of the first portion of the focused laser beam passing through the pinholes for replaying a target track on the holographic medium, wherein the second portion of the focused laser beam reflected back to the focusing lens is converted into a return laser beam by the focusing lens, and wherein a focusing servo unit focuses the return laser beam and then checks the focused image of the return laser beam to compensate for vertical movements of the holographic medium.

9. A holographic method comprising the steps of:

(a) producing an incident laser beam by irradiating a reference beam onto a holographic medium having a plurality of tracks;

(b) focusing the incident laser beam by a focusing lens, to thereby produce a focused laser beam;

(c) receiving a first portion of the focused laser beam through pinholes which are located at a pinhole plate and, at the same time, reflecting a second portion of the focused laser beam back to the focusing lens by the pinhole plate;

(d) detecting the amount of the first portion of the focused laser beam passing through the pinholes; and (e) moving either the pinhole plate or the focusing lens to control the amount of the first portion of the focused laser beam passing through the pinholes for replaying a target track on the holographic medium, wherein the second portion of the focused laser beam reflected back to the focusing lens is converted into a return laser beam by the focusing lens, and wherein a focusing servo unit focuses the return laser beam and then checks the focused image of the return laser beam to compensate for vertical movements of the holographic medium.

* * * * *